United States Patent [19]
Johnson

[11] 3,766,561
[45] Oct. 16, 1973

[54] HIGH RESOLUTION AIRCRAFT RADAR ANTENNA

[75] Inventor: Francis B. Johnson, Northridge, Calif.

[73] Assignee: The United States of America as represented by the Secretary of the Navy, Washington, D.C.

[22] Filed: Dec. 30, 1969

[21] Appl. No.: 4,793

[52] U.S. Cl................. 343/705, 343/876, 343/763
[51] Int. Cl............................................... H01q 128
[58] Field of Search.................... 343/705, 872, 713, 343/876, 100 SA

[56] References Cited
UNITED STATES PATENTS

| | | |
|---|---|---|
| 2,984,834 | 5/1961 | Howard et al. ..................... 343/705 |
| 3,058,107 | 10/1962 | Danielson ....................... 343/876 X |
| 2,702,346 | 2/1955 | Evans et al. ..................... 343/872 X |
| 3,026,516 | 3/1962 | Davis .................................. 343/705 |

Primary Examiner—Carl D. Quarforth
Assistant Examiner—Joseph M. Potenza
Attorney—R. S. Sciascia and P. S. Collignon

[57] ABSTRACT

A high resolution aircraft radar antenna having a pair of long alternately activated radio frequency (RF) antenna arrays in back-to-back relation within an elliptical cross-sectional boom of good aerodynamic characteristics supported on a retractable mounting from an aircraft and capable of producing slow boom rotation beneath the aircraft in the extended condition and streamlined with the fuselage in the retracted position for low drag to provide 360° radar search scanning and tracking operation.

2 Claims, 4 Drawing Figures

PATENTED OCT 16 1973  3,766,561

INVENTOR.
FRANCIS B. JOHNSON
BY
H. H. Losche
ATTORNEYS

HIGH RESOLUTION AIRCRAFT RADAR ANTENNA

BACKGROUND OF THE INVENTION

This invention relates to aircraft search radar antenna arrays and more particularly to rotatable type antenna arrays which are extendible below an aircraft body for scanning throughout 360 degrees.

Known antennas of this type utilize a single antenna array that is rotated at some desired speed, usually about six revolutions per minute. There are severe limitations on the scanning speed used in aircraft environments such that the speed of 6 RPM for a single antenna array cannot be increased to speed up search operations, particularly with the addition to the array length to increase the aperture, as would appear to be the most economical solution. Such a slow scanning rate makes the aircraft carrying the antenna vulnerable to undetected fast moving enemy aircraft, particularly when both aircraft are closing.

SUMMARY OF THE INVENTION

In the present invention two long antenna arrays are positioned in back-to-back relation within a boom that is streamlined in an elliptical or oval cross-sectional configuration. The center of the boom is supported by a retractable member of an aircraft to retract the boom in aligned contact with the fuselage to reduce drag to a minimum or to extend the boom below the aircraft fuselage. The boom, in its extended position, has means through the retractable member to rotate the boom on the axis of the array center to cause each antenna array to scan throughout 360°. Thus, with a rotational speed of only 3 RPM the scan will be equivalent to that of the single array antenna rotating at 6 RPM with equal apertures but the apertures can be increased in the dual array by additional array length to improve resolution. The two antenna arrays are alternately pulsed which provide increased accuracy by halving the rate of rotation per antenna array and increasing the aperture of each antenna. It is accordingly a general object of this invention to provide an extendible and rotatable search antenna for aircraft having a pair of back-to-back antenna arrays of wide aperture in a streamlined enclosure for slow rotational omni search scan.

BRIEF DESCRIPTION OF THE DRAWING

These and other objects and the attendant advantages, features, and uses will become more apparent as the description proceeds when taken in consideration with the accompanying drawing in which.

BRIEF DESCRIPTION OF THE PREFERRED EMBODIMENT

Figure 1:
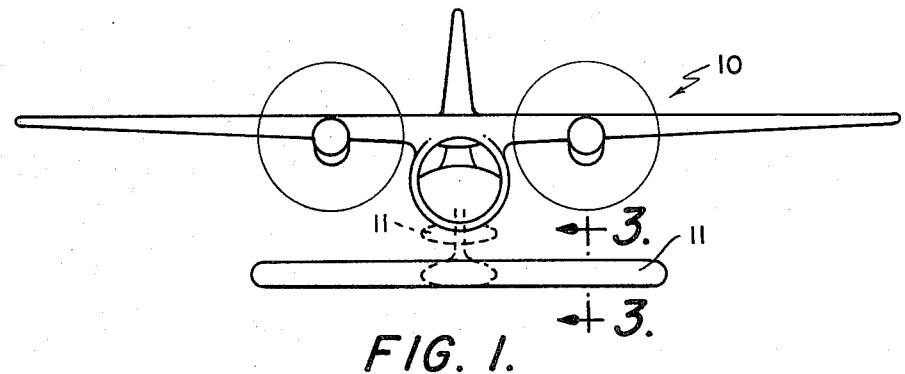
FIG. 1 illustrates a head-on elevational view of a twin engine aircraft showing the antenna array of this invention in its extended position and the retracted position in dotted lines.
Figure 2:
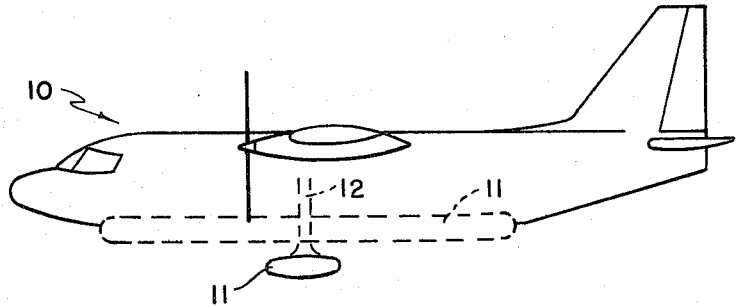
FIG. 2 illustrates a side elevation of the aircraft and antenna of FIG. 1.

Referring more particularly to FIGS. 1 and 2, FIG. 1 illustrates a twin engine aircraft 10 in a head-on view while FIG. 2 illustrates this aircraft in a side elevational view. Shown in the extended position is the antenna array 11 supported from the aircraft fuselage belly by any suitable retractable-extendible mechanism 12 of the type more fully described in the U.S. Pat. No. to Howard, Jr. et al. 2,984,834 and H. al., Evans et al., 2,702,346. Since the extendible-retractable mechanism forms no part of this invention, and any suitable mechanism may be used in this invention, no further description will be given of this mechanism. The antenna array 11 in its extended position, as shown in FIGS. 1 and 2, is operable to be rotated for 360 degrees antenna scanning, as will later become more fully understood in the description of operation. The antenna 11 in its retracted position will be nestled in or against the fuselage belly, as shown in dotted lines in FIGS. 1 and 2, to provide the least amount of drag in flight and clearance for take-offs and landings when the antenna is not in use.

Figure 3:
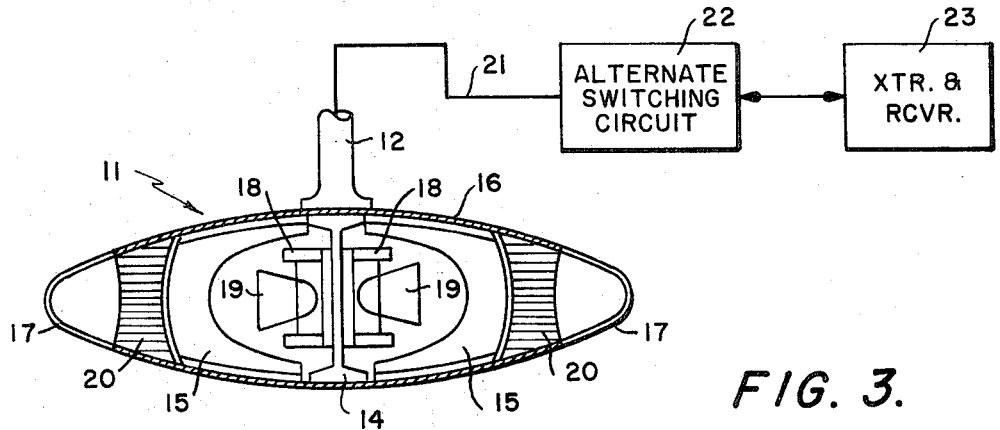
FIG. 3 illustrates a cross-sectional view of the antenna array taken on the line 3—3 in FIG. 1 with an electric circuit thereto shown in block diagram.

Referring more particularly to FIG. 3, the dual antenna array is shown in cross-section in which a main supporting beam 14 has rib members 15 affixed thereto on opposite sides as to the right and to the left as viewed in FIG. 3 in the same manner as ribs of an airfoil, wing, or the like, to support a shell member 16 of elliptical or oblong cross-sectional configuration. The two small radii of curvature 17 of the shell consists of dielectric material which constitutes the microwave windows for the antenna arrays. Two or a pair of antenna arrays are mounted back-to-back on the beam 14 consisting of the waveguide assemblies 18 and the horn structures 19. The waveguide assemblies 18 and horn structures are positioned between the rib members 15, as well understood by those skilled in the art, to provide proper transmission and reception of RF frequencies. Between the ribs 15 and the dielectric covers 17 are waveguide lenses 20 to provide the proper lens systems for the dual array antenna waveguides in the transmission and reception of RF signal. RF signals are conducted through each of the horns 19 between ribs 15 and through the lens systems 20 and through the dielectric covers 17 for transmission to illuminate targets and for reflection of any targets within the beam width of the antenna. These transmitted and received signals are by way of the conductor means 21 through an alternate switching circuit 22 to and from the transmitter and receiver circuit 23, as shown in block circuit schematic in FIG. 3. The alternate switching circuit 22 is of any well known type such as ferrite or varactor type microwave switches described in the texts of Radar Handbook by Merril I. Skolnik, 1970, published by McGraw-Hill Book Company, pages 8–25, 26 and Airborne Radar, Principles of Guided Missile Design, 1961, published by D. Van Nostrand Co., Inc., pages 561-2. The alternate switching circuit 22 energizes the right and left antenna arrays, as shown in FIG. 3, alternately so that for every revolution of the antenna array 11 both antennas will give complete 360° scanning over the beam width area of the antenna, thereby reducing the scan period and increasing accuracy.

As hereinbefore stated of single rotatable type antenna arrays, usually a maximum rotational speed of 6 RPM is ordinarily used with an antenna for an aperture or length of approximately 30 feet. Any increase in this aperture or length of the antenna array causes complications in any attempt to increase the rotational speed of the antenna and, accordingly, this 30 feet of antenna array and the rotational speed of the antenna is limited. In the present invention the aperture can be increased to 50 feet or more in antenna array length which greatly improves the resolution of the antenna. This is possible by virtue of the back-to-back antenna array which allows a decrease in rotational speed to about 3 RPM providing the same antenna coverage with higher resolution.

OPERATION

Figure 4:
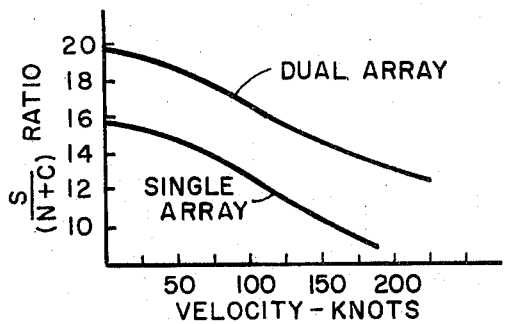
FIG. 4 provides a signal-to-noise plus clutter ratio graph comparing the antenna array of this invention with a single antenna array.

In the operation of the dual antenna array the antenna is first extended by the mechanism 12 in the aircraft and rotated at 3 RPM with the transmitter and receiver in the operative condition to alternately pulse the dual antennas. This will provide a single-to-noise plus clutter ratio in comparison with a single array, as shown in FIG. 4. Let $\alpha$ = the aperture, $\omega$ the RPM, and $\Delta$ the period of the single and dual antennas. For a single antenna $$\alpha = 30'$$
$$\omega = 6 \text{ RPM}$$
$$\Delta = 10 \text{ Sec.}$$

For the dual antenna of this invention $$\alpha = 50'$$
$$\omega = 3 \text{ RPM}$$
$$\Delta = 10 \text{ Sec.}$$

With the above operative conditions it may be realized from the illustration in the graph of FIG. 4 that the dual antenna array of this invention provides a higher signal-to-noise plus clutter ratio $$S/(N + C)$$

than that of a single antenna array. As shown in FIG. 4 both single and dual arrays drop off in the signal-to-noise plus clutter ratio as the velocity in knots increases.

While only a preferred embodiment is shown to describe the invention, applicant desired to set out the spirit of his invention by the scope of the appended claims.

I claim:

1. A high resolution aircraft radar antenna that is extendible for rotation and retractable for low drag storage on an aircraft comprising:

a pair of elongated antenna arrays supported together in back-to-back relation on a beam;

an elongated elliptical shell housing said pair of antennas and supported on said beam with the two edges of short radii being of dielectric material to provide opposite microwave windows for said pair of antenna arrays therein, said shell having a central support on one long radius of curvature attachable to an aircraft for controlled retraction, extension and rotation thereof; and a switching circuit coupled between said pair of antenna arrays and a radar transmitter and receiver to alternately activate said pair of antenna arrays whereby support of said central support on an aircraft for retraction, extension and rotation of said pair of antenna arrays activated alternately provides two scans 180° apart per revolution of said antenna arrays.

2. A high resolution aircraft radar antenna as set forth in claim 1 wherein said support of said shell on said beam includes ribs placed radially along the longitudinal length of said shell interior between array waveguide openings and fixed to said beam with microwave lenses supported in said shell between said ribs and said dielectric material providing microwave transmission therethrough.

* * * * *